(No Model.)

D. HIGHAM.
ELECTRIC MOTOR.

No. 372,910. Patented Nov. 8, 1887.

Witnesses.
John E. Parker
William D. Conner.

Inventor.
Daniel Higham
By his Attorneys Howson & Sons

United States Patent Office.

DANIEL HIGHAM, OF PHILADELPHIA, PENNSYLVANIA, ASSIGNOR TO THE HIGHAM ELECTRIC MOTOR COMPANY, OF SAME PLACE.

ELECTRIC MOTOR.

SPECIFICATION forming part of Letters Patent No. 372,910, dated November 8, 1887.

Original application filed November 23, 1886, Serial No. 219,614. Divided and this application filed May 2, 1887. Serial No. 236,752. (No model.)

*To all whom it may concern:*

Be it known that I, DANIEL HIGHAM, a citizen of the United States, and a resident of Philadelphia, Pennsylvania, have invented certain Improvements in Electric Motors, of which the following is a specification.

The object of my invention is to so construct electric motors as to increase their efficiency, as more fully set forth hereinafter.

Figure 1:
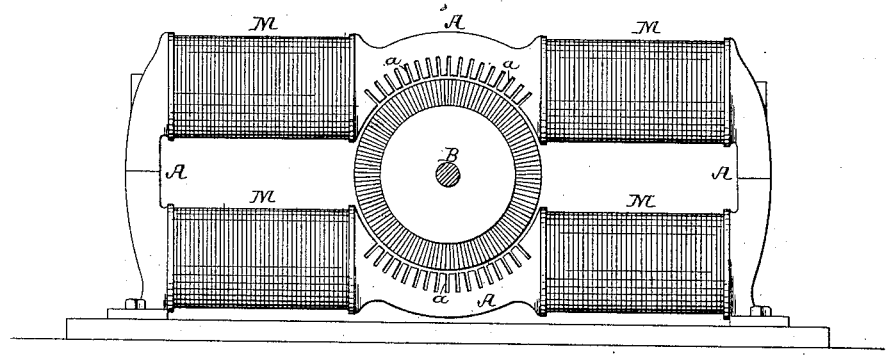
Figure 2:
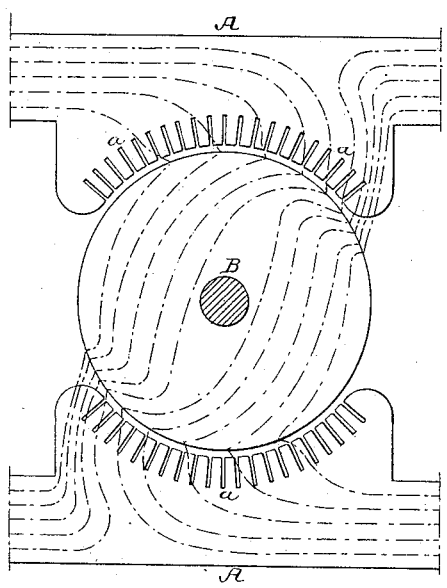
Figure 3:
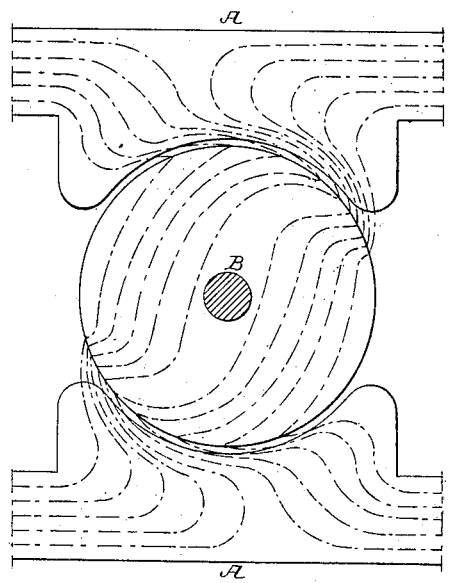
Figure 4:
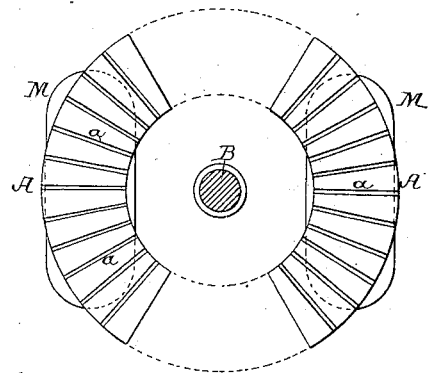

In the accompanying drawings, Figure 1 is a side view, with armature-shaft in section, of an electric motor provided with my improvements. Figs. 2 and 3 are diagrams explanatory of my invention; and Fig. 4 is a sectional view of another form of electric motor, illustrating the application of my invention thereto.

In electric motors as now constructed a certain amount of electric energy in the coils of the armature is consumed in the production of a magnetic force in the poles of the field-magnets, owing to the close proximity of the armature-coils to the field-magnet pole-pieces. This magnetic force set up in the field-magnet pole-pieces by the armature-coils, together with the magnetic force produced by the field-magnet coils themselves, causes the magnetic lines to take the form which I have illustrated in Fig. 3. Although a portion of the current in the armature-coils thus acts with the current of the field-magnet coils in setting the magnetic lines in the field-magnet, it nevertheless reduces the efficiency of the motor for the following reasons:

In well-designed electric motors a given number of ampère-turns on the armature-core will consume fifty to sixty times more electric energy than the same number of ampère-turns on the field-magnet cores, this increased expenditure of electrical energy in the armature-coils over that expended in the field-magnet coils being due to the counter electro-motive force of the armature. If, therefore, a given number of ampère-turns on the armature-core cost fifty to sixty times more than the same number of ampère-turns on the field-magnet cores, it will be evident that it will be much more economical to magnetize the field-magnet by the field-magnet coils alone. It will furthermore be seen that in the ordinary construction of electric motors more wire will be required on the armature than would otherwise be necessary to produce a given amount of armature magnetism, since a portion of the armature current is consumed in the magnetic effect on the field-magnet pole-pieces, and consequently there is an increased distance between the core of the armature and the field-magnet pole-pieces.

To practically prevent any portion of the electrical energy of the armature-coils from influencing the magnetic current of the field-magnets, I slit or laminate the faces of the field-magnet pole-pieces adjacent to the armature-coils on lines radiating from the axis of the armature and transversely to the direction of rotation of the armature, as shown at *a* in Fig. 1. In a motor provided with these improvements the magnetic circuit will take the form indicated in Fig. 2. If the motor be of a construction similar to that of the well-known Brush dynamo-electric machine, for instance, the slits *a* will be cut in the faces of the pole-pieces A, in the manner illustrated in Fig. 4, which is a transverse section through the armature-axis B, looking toward the faces of the poles of one of the field-magnets M M.

It is important in forming the slits in the faces of the pole-pieces that they shall not be wider than is absolutely necessary to prevent the passage of the magnetic lines of force, for undue cutting away of the faces of the pole-pieces will tend to reduce the efficiency of the machine.

I do not wish to claim in this application, broadly, the slitting or laminating of the field-magnet pole-pieces, as that forms the subject of an application for patent filed by me November 23, 1886, Serial No. 219,614, of which this application is a division. The essential feature of the invention forming the subject of this application is the radial arrangement of the slits as the most effective for preventing the distortion of the lines of force by preventing the armature-current from influencing the magnetic circuit of the field-magnet.

I claim as my invention—

An electric motor having its field-magnet pole-pieces slit or laminated on lines radiating from the center of the axis and transversely to the direction of rotation of the armature, substantially as and for the purpose set forth.

In testimony whereof I have signed my name to this specification in the presence of two subscribing witnesses.

DANIEL HIGHAM.

Witnesses:
HUBERT HOWSON,
HARRY SMITH.